United States Patent
Mathias et al.

[15] 3,681,978
[45] Aug. 8, 1972

[54] METHOD AND APPARATUS FOR AUTOMATICALLY BALANCING DEFLECTION SENSORS ON ROTATING EQUIPMENT

[72] Inventors: Richard A. Mathias; Edgar J. Watson, both of Cincinnati, Ohio

[73] Assignee: Cincinnati Milacron Inc., Cincinnati, Ohio

[22] Filed: Feb. 23, 1971

[21] Appl. No.: 118,063

[52] U.S. Cl..................................................73/71.4
[51] Int. Cl..........................................G01m 13/00
[58] Field of Search...............73/71.4, 67; 324/61 R

[56] References Cited

UNITED STATES PATENTS 3,348,234  10/1967  Foster.................73/71.4 UX
3,550,107  12/1970  Thompson et al......73/71.4 X

*Primary Examiner*—James J. Gill
*Attorney*—Howard T. Keiser and Alfred J. Mangels

[57] ABSTRACT

A method and apparatus for automatically balancing a periodic deflection signal being produced by deflection sensors which are applied to a rotating body. A device is provided for dividing each period of the deflection signal into a number of timing periods. During each timing period, while the body is idling, a digital signal representing the deflection signal is generated and input into storage. During successive corresponding periods of the deflection signal, when an external load is applied to the body, the digital signal is retrieved from storage and converted into an analogue noise signal. The noise signal is subtracted from the deflection signal thus balancing the sensors and producing a corrected deflection signal representing a very accurate indication of deflection of the body as a result of the external load.

10 Claims, 8 Drawing Figures

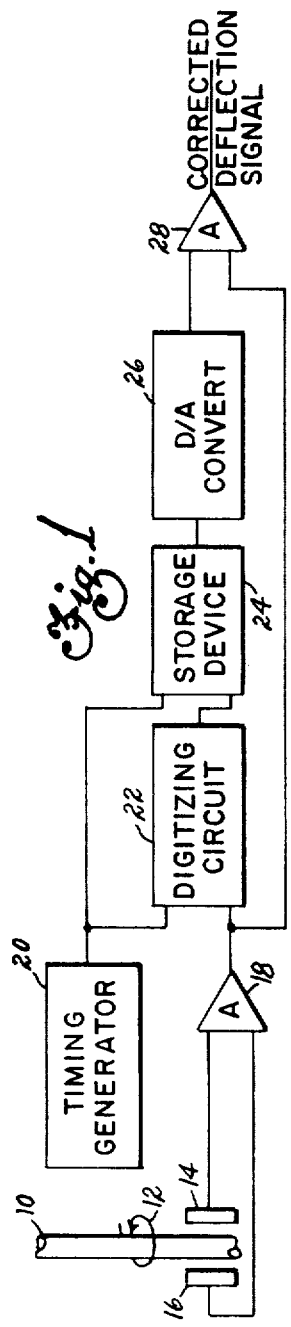
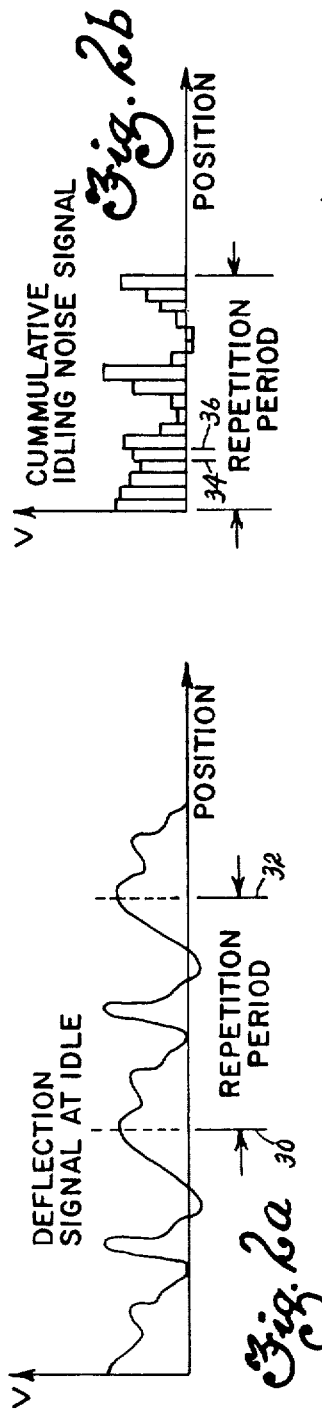
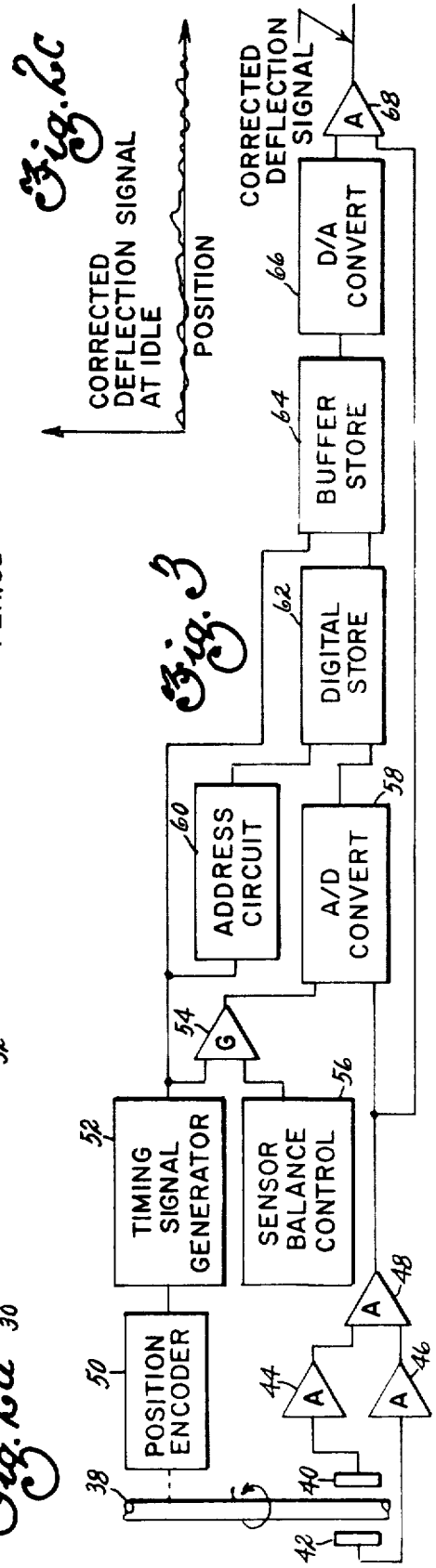

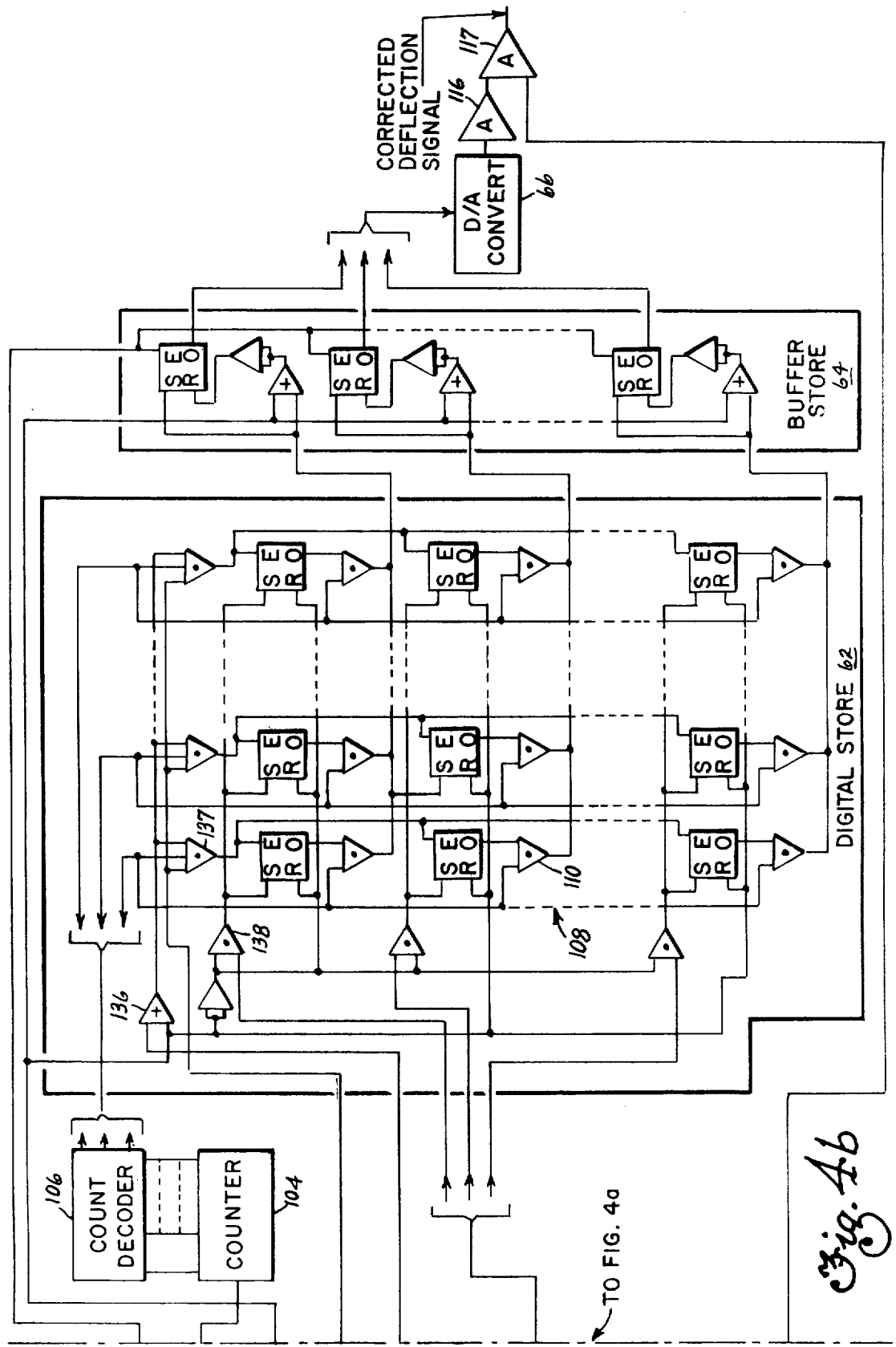

3,681,978

METHOD AND APPARATUS FOR AUTOMATICALLY BALANCING DEFLECTION SENSORS ON ROTATING EQUIPMENT

BACKGROUND OF THE INVENTION

The invention relates generally to the problem of balancing deflection sensors which are applied to a rotating body. Specifically, the invention relates to the problem of compensating for the unwanted portion of the deflection signal present on the sensor output when the rotating body is in an unloaded condition, i.e. idling.

There are many applications in which it is desirable to measure the deflection of a rotating body upon the application of an external load. Although the problems discussed here will be specifically applicable to machine tools, it will be readily apparent that similar problems exist in any application relating to deflections of a rotating body. Therefore, the use of machine tools to define a particular embodiment is not to be considered a limitation on the application of the disclosed invention. Of particular interest to applicant is the deflection of a rotating spindle containing a cutting tool when said tool is engaged in the cutting process. However, any time sensors are applied to a rotating spindle which is unloaded or in an idling condition, a periodic deflection signal is produced from the sensors. There are many reasons for this problem. First, the physical laws which control our activities more often than not result in losses and imperfections in the mechanical equipment. Second, practically speaking, one can only manufacture and assemble parts within certain discrete tolerances. The tolerances are specified such that any imperfections occurring therein are deemed to be acceptable. However, as the requirement for more accurate machining increases, the effect of even relatively small imperfections becomes important. For example, the rotating spindle will not be perfectly concentric and its point of support will always contain eccentricities which result in an imperfect rotation. Second, the spindle will typically be supported by a bearing assembly, again this assembly will contain parts with eccentricities. Third, the spindle and bearing assembly is mounted in some machine structure. Therefore, a stiffness factor is associated with the bearing assembly and machine structure. Since the stiffness is not absolute, the rotation of the shaft will result in some deflection in the bearing and machine structure which contributes to the imperfections in rotation. Fourth, temperature variations will cause size variations in all the elements which are not constant and do not effect each of the elements in the same manner. The end result is an eccentric rotation of the spindle. In addition, over a given period of time, the above parameters may change; and hence, the center of rotation may change. The problem is one of automatically compensating for the imperfections in spindle rotation and producing a corrected deflection signal which is truly indicative of the spindle deflection caused by an external load.

Since the spindle rotation is cyclic in nature, the above irregularities combine to generate a deflection signal that is generally cyclic or periodic. Hence, the signal appears as a very irregular but periodic wave form occurring with some DC bias level. Traditional systems provide some compensation for this inherent deflection signal. Usually, the operator is provided with a bias potentiometer which allows him to null out a deflection indicator during an idling or no-load condition. This method has several disadvantages. Aside from being time consuming, requiring operator attention and readjustment every time the no load conditions change, the bias only provides a time average adjustment. However, at any particular time, the magnitude of the idling deflection output may be substantial. More sophisticated systems provide a sinusoidal compensation in addition to the bias adjustment. Again, however, this compensation is of a fixed nature and recalibration is necessary whenever no load conditions change or the phase of the period of the deflection changes with respect to the rotation of the spindle. To overcome these problems, applicant proposes a method and apparatus for automatically and continuously detecting and storing a digital signal representing one period of a deflection signal produced by deflection sensors responsive to an idling rotating spindle. Further, when a load is applied to the spindle, the apparatus reproduces said stored digital signal in synchronization with successive periods of the deflection signal and converts it into an analogue idling noise signal. The idling noise signal is subtracted from the deflection signal to produce a corrected deflection signal which is a true and accurate representation of the spindle deflection caused by the external load. Further, applicant proposes a method for achieveing the above which may be executed on a properly programmed digital computer.

SUMMARY OF THE INVENTION

Applicant proposes a method and apparatus for providing an automatic balancing of deflection transducers which are responsive to a rotating body. A deflection transducer circuit is responsive to an idling rotation for producing a periodic deflection signal. Further, a timing generator divides each period of the deflection signal into a number of timing periods. During each timing period, a digitizing circuit provides a digital signal representing the magnitude of the deflection signal. The digital signal is then stored in a storage element unique to said timing period. Further, during each timing period, a previously stored digital signal is transferred from the storage element to a digital to analogue converter. An output from the converter is subtracted from the deflection signal thereby producing a corrected deflection signal which defines a balanced condition of the deflection sensors.

BRIEF DESCRIPTION OF THE DRAWINGS

FIG. 1 is a general block diagram of the invention.

FIGS. 2a, 2b and 2c are graphical representations of a deflection signal at various stages in the circuit of FIG. 1.

FIG. 3 is detailed block diagram of one embodiment of the invention.

FIGS. 4a and 4b when joined along the indicated junction lines illustrate a detailed schematic diagram of the embodiment shown in FIG. 3.

DESCRIPTION OF THE PREFERRED EMBODIMENTS

Figure 4A:
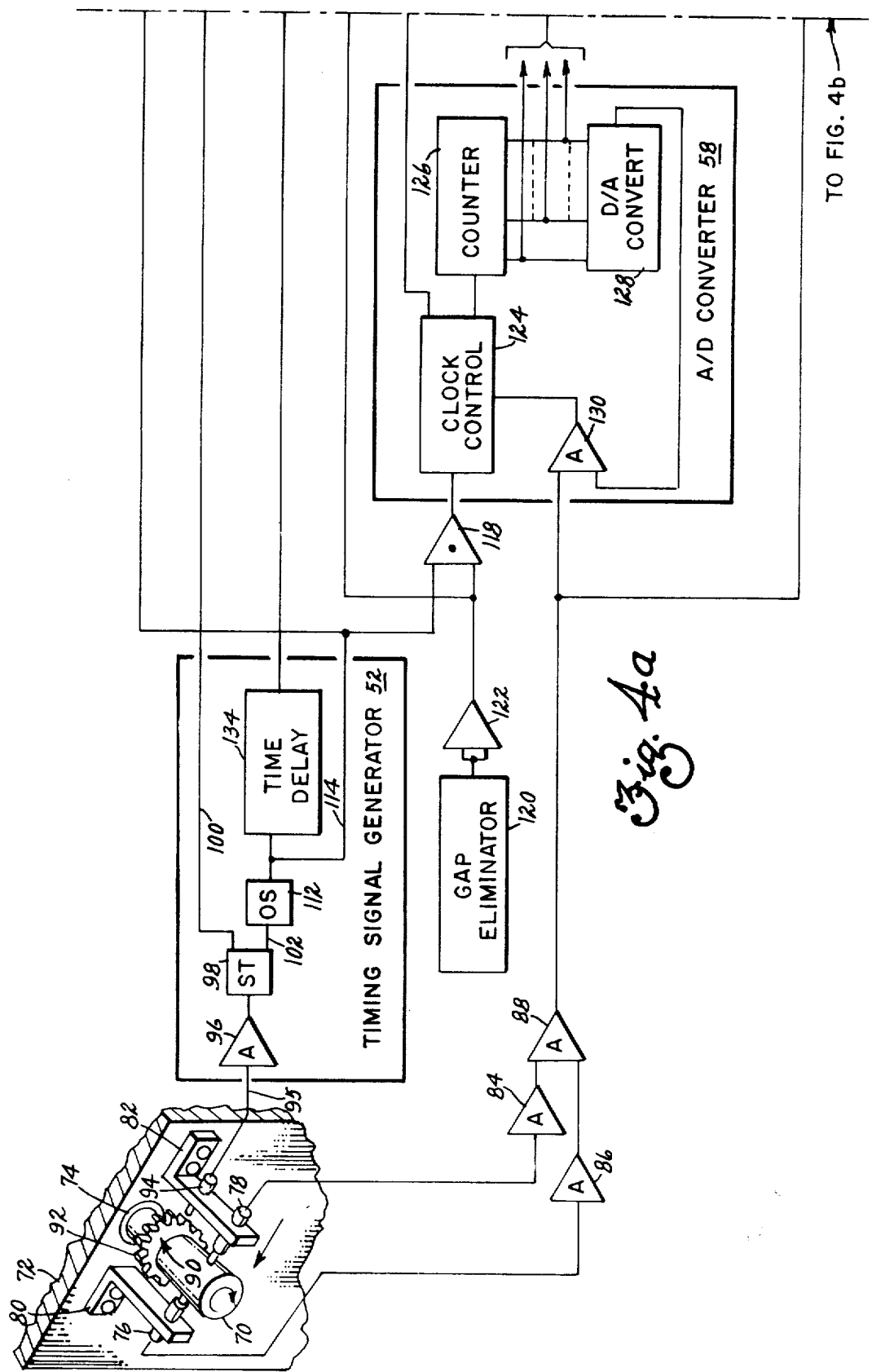

FIG. 1 is a general block diagram of the invention. A body 10 is rotating in a direction of the arrow 12. The body is supported in a structure (not shown) and drives a load such as a cutting tool which is also not shown. The exact nature of these elements is not particularly important. What is important is that the body will not experience a perfectly concentric rotation. This is true whether or not the body is in a loaded or unloaded condition. Therefore, when there is no load applied to the body, the deflection sensors 14 and 16 will produce analogue signals which will appear as a deflection signal on an output of an amplifier 18. A timing generator 20 operates continuously and cyclically with the body rotation. The generator produces a number of sampling signals as a function of the period of the deflection signal. These sampling signals represent timing periods for synchronizing the operation of the remaining circuit elements with the period of the deflection signal. Each sampling signal is operative to drive a digitizing circuit 22 which is also responsive to an output of amplifier 18. The digitizing circuit 22 produces a digital signal representing the magnitude of the deflection signal during each timing period. The digital signal is input to a storage device 24 and stored in a particular location therein determined by the sampling signal from the generator 20. In addition, the sampling signal is operative to produce a previously stored digital signal to an input of a digital to analogue converter 26 which converts the previously stored digital signal into an output idling noise signal. The idling noise signal is input to an amplifier circuit 28 and subtracted from the output of the amplifier 18 thus producing a corrected deflection signal. The generator 20, digitizing circuit 22, storage device 24, converter 26 and amplifier 28 comprise a sensor balancing computer. Each element may be manifested by a discreet logic hardware circuit. However, each element performs an operation or step that is available in a general purpose digital computer. Therefore, a program may be prepared which when input to a digital computer would temporarily assimilate a configuration of circuit elements similar to those described in FIG. 1. This embodiment will be described in more detail later.

FIG. 2a is a graphical representation of a typical unloaded deflection signal from the amplifier 18. A typical period is indicated between the lines 30 and 32. FIG. 2b illustrates how the sampling signals divide a period of the deflection signal into a number of timing periods. A timing period being typically indicated between the lines 34 and 36. Further, FIG. 2b illustrates that if the idling noise signals from the converter 36 are taken sequentially and cumulatively over a period of the deflection signal they in fact approximate the wave shape of the deflection signal. FIG. 2c illustrates the corrected deflection signal on the output of amplifier 28 when the body is idling. It should be noted that some noise remains, however, the disclosed apparatus reduces the idling noise by an order of magnitude over what was possible in prior system. Further, the disclosed apparatus is completely automatic and continuously updates the idling noise signal as the characteristics of the body rotation change. Therefore, an order of magnitude more accurate deflection measurement can be obtained when a load is applied to the rotating shaft.

FIG. 3 is a detailed block diagram of one embodiment of the invention. Deflection of a rotating shaft 38 is measured by deflection sensors 40 and 42 which produce analogue signals. The analogue signals pass through amplifiers 44 and 46 and are summed in a differential amplifier 48 which produces a deflection signal. Thus the transducer 40 and 42 and amplifiers 44, 46 and 48 operate as a transducer circuit which is a standard configuration of elements well-known to those who are skilled in the art. Mechanically coupled to the shaft 38 is an encoder 50. The encoder 50 cyclically produces a number of sampling signals representing timing periods during each period of the deflection signal. As mentioned earlier, the period of the deflection signal is a function of the shaft rotation. MOst generally the period will correspond to one revolution of the shaft. However, depending on the mechanism driving the shaft and other factors, the period may be a function of fractional or multiple rotations. In this case, the duration of the timing period may be varied mechanically by providing a drive variation between the encoder and the rotating shaft. The duration of the timing periods may be varied electrically by providing a division or multiplication of the sampling signals on the encoder output. Finally, if one were using a computer, the duration of the timing period could be defined for any deflection signal by properly programming a control unit of the computer. For purposes of this disclosure, the period of the deflection signal will be defined by one revolution of the shaft 38. Therefore, the encoder 50 may be coupled directly to the shaft 38. The sampling signals from the encoder 50 are input to a timing signal generator 52. The encoder 50 and generator 52 comprise a timing generator. The timing signal generator 52 produces a number of timing signals for each sampling signal input from the encoder 50. A first timing signal provides an input to an addressing circuit 60 which is operative to address a storage element in a digital store 62. A second timing signal provides an input to a buffer store 64 and operates to transfer a digital signal contained in the digital store 62 to the buffer store 64. For purposes of this disclosure, the buffer store 64, digital store 62 and addressing circuit comprise a complete storage device. Therefore, the second timing signal causes a previously stored digital signal to immediately appear on an output of the buffer store 64. The buffer store maintains this signal as an input to a digital to analogue converter 66. The converter 66 is responsive to the input to produce an idling noise signal which is connected to a differential amplifier 68. The amplifier 68 subtracts the idling noise signal from a second input responsive to the deflection signal from the amplifier 48 to produce a corrected deflection signal. This corrected deflection signal is indicative of a balanced sensor condition using an idling noise signal which was detected during a corresponding time period of an immediately previous period of the deflection signal. Since the time constant of the sampling signals is very small compared to the time constant of the sensor drift, the signal is a very accurate representation of the deflection signal magnitude during the present timing period.

The second timing signal is also input to a logic gate 54, having another input connected to a sensor balance control 56. It should be remembered that the ltimate objective of the disclosed apparatus is to improve ultimate measurement of deflection of a rotating shaft under the influence of an external load by removing the effect of deflection inherent in the shaft rotation. Therefore, the sensor balancing process must occur when the shaft is in an unloaded condition. The sensor balance control 56 produces a control signal defining the condition of the shaft load. The control may be push button which is activated by an operator when the balancing process is desired. The control 56 may be a control relay which is activated at the proper time by a program commanding a balancing cycle of the sensors. Further, the control 56 may be an automatic inprocess control which continuously balances the sensors whenever the shaft is idling. The only requirement is that a control signal be produced whenever the shaft is free from an external load; and said control signal be terminated whenever an external load is applied to the shaft. When there is no external load on the shaft, the control 56 produces the control signal permitting the timing signal from the generator 52 to pass through the gate 54 and initiate a conversion cycle in an analogue to digital converter 58. However when an external load is applied to the shaft, the control 56 terminates the control signal thereby inhibiting the timing signal from the generator 52; and hence, the conversion cycle in the converter 58 is also inhibited.

Assume there is no external load on the shaft. The second timing signal initiates the analogue to digital converter 58, which operates to produce a digital signal representing the magnitude of the deflection signals during the present timing period. After the converter 58 finishes its cycle, the timing generator 52 produces a third timing signal for transferring the digital signal from the converter 58 into the storage element of the digital store 62 being addressed by the addressing circuit 60 during this timing period.

FIGS. 4a and 4b when joined along the indicated junction line, comprise a detailed schematic diagram of the embodiment shown in FIG. 3. For purposes of clarification, the invention will be described as it is applicable to calibrating deflection sensors on a rotating spindle of a machine tool. A spindle 70 is mounted in a machine tool 72 by means of a bearing assembly 74. Deflection transducers 76 and 78 are mounted in the proximity of the spindle 70 on brackets 80 and 82 respectively fastened to the structure 72. Output analogue signals from the transducers 76 and 78 pass through preamplifiers 84 and 86 and are summed in the differential amplifier 88. Amplifier 88 produces a deflection signal representing total deflection of the spindle. Also attached to the spindle is a timing ring 90. The ring contains a number of teeth typically shown at 92 equal to the number of timing periods required in one revolution of the spindle. A proximity switch 94 is mounted in the bracket 82 adjacent to the timing ring 90. Every time a gear tooth passes the switch 94, the switch closes and is opened during the time period between teeth. Therefore, the timing ring and proximity switch 94 comprise a position encoder which produces sampling signals representing timing periods on an input to an amplifier 96 in the timing generator 52. Amplifier 96 is connected to a Schmidt trigger 98 which provides a very fast switching action on its output. The Schmitt trigger 98 is connected to trigger on the positive going edge of the pulse output from the amplifier 96. The Schmitt trigger upon switching produces a positive going timing signal on an output 100 and an inverted signal on an output 102. The timing signal on the output 100 is connected to and triggers a counter 104 shown in FIG. 4b. The output of the counter 104 is input to a count decoder 106. This is a standard configuration of logic gates for producing a single unique output for each unique state of the counter 104.

It should be noted that the counter 104 and decoder 106 combine to form an addressing circuit. The design and operation of which is well-known to those who are skilled in the art of digital logic design. Typically, if operating continuously, the counter cyclically counts through a number of unique states or counts depending on the size of the counter. In the embodiment of FIG. 4, a very general case is shown where the period of the analogue signal corresponds to one revolution of the spindle 70. Further, the number of unique states in the counter 104 is equal to the number of teeth 92 on the timing ring 90. Therefore, one cycle of the counter corresponds to one period of the deflection signal. As will be appreciated by those who are skilled in the art, a much larger counter may be used. FUrther, by using the count decoder 106, the counter cycle can be set to any number of unique states less than the counter maximum. In this way, the cycle of the counter or the period of the sampling cycle may be made to correspond to any period of the deflection signal regardless of their relationship between the period of the deflection signal and the rotation of the spindle. This technique can be very readily implemented in a program when using a general purpose digital computer.

The outputs of the decoder 106 are connected to the digital store 62. The digital store is shown as a matrix of set/reset flip flops. However, any type of storage device may be used. Each vertical column typically shown at 108 defines a storage element which is unique to a decoder output. As indicated by the dashed lines between the second and third columns, any number of counts may be used. This is an arbirtrary design decision based on the sampling resolution or the accuracy desired. In each vertical column, a number of flip flops are used to store a digital signal representing the deflection signal. Again, as indicated by the dashed lines between the second and third rows of flip flops, the number of flip flops in each column is dependent on the desired resolution of the digital signals stored therein. Upon the Schmitt trigger 98 producing a timing signal on an output 100, the counter 104 increments one count which is decoded by the decoder 106. The decoder produces an output which addresses one of the storage elements in the store 62. The decoder is operative to open an AND gate typically shown at 110 which allows the digital signal in that column to be connected to the inputs of the buffer store 64. The buffer store 64 contains a single column of flip flops or storage elements.

For purposes of this disclosure, the following conventions will be adopted. An AND gate is represented by a triangular symbol having a dot contained therein.

An OR gate is represented by a triangular symbol having a plus sign contained therein; and an inverter is represented by a triangular symbol having the inputs leading thereto joined together.

Returning to FIG. 4a, the inverted signal on the output 102 of the Schmitt trigger 98 triggers the monostable multivibrator 112 which produces a second timing signal on an output 114. The second timing signal from the multivibrator 112 performs several functions. First, it is operative to enable the flip flops of the buffer store 64 thus storing a digital signal from a storage being addressed by the first timing signal. Upon the enabling action, an output is sustained by the buffer store 64 which is connected to the digital to analogue converter 66. This produces an analogue idling noise signal having a sign and magnitude corresponding to the sign and magnitude of the digital signal received from the buffer store 64. The idling noise signal passes through a preamplifier 116 and is subtracted in a differential amplifier 117 from the deflection signal from the amplifier 88. Hence, a corrected deflection signal is produced on an output of the amplifier 117. The second timing signal from the multivibrator 112 is also input to a logic gate 118 which has a second input connected to a gap eliminator circuit 120. The gap eliminator circuit 120 represents one embodiment of the sensor balance control 56 shown in FIG. 3 and discussed earlier. The gap eliminator circuit produces a first control signal when the spindle is idling and a second control signal when the spindle is under a load or in the cutting process. There are several such circuits known in the art; and, therefore, its details will not be discussed. If the spindle is idling, the first control signal produced by the gap eliminator 120 passes through an inverter 122 and opens the gate 118. This allows the second timing signal to be input to and initiate the operation of the analogue to digital converter 58. Within the converter 58 which is of a standard configuration, the second timing signal triggers a clock control 124 which initiates a conversion cycle. The clock control 124 energizes a counter 126 which is connected in parallel with a digital to analogue converter 128. The converter 128 produces an analogue signal having a magnitude proportional to the magnitude represented by the digital signal in the counter 126. The output of the converter 128 is connected to a differential amplifier 130 which has another input connected to the amplifier 88. The amplifier 130 compares the output from the converter 128 with the deflection signal output form the amplifier 88. When the output from the converter 128 has a magnitude equal to the magnitude of the deflection signal from the amplifier 88, the amplifier 130 produces an output to the clock control 124 which is operative to stop the conversion cycle. Therefore, the counter 126 contains a digital signal representing the sign and magnitude of the deflection signal. Typically, a conversion cycle takes around 10 microseconds. In addition to loading the buffer store 64 and initiating the converter 58, the second timing signal from the multivibrator 112 is operative to trigger a time delay 134. The purpose of the time delay 134 is to reset or clear the addressed storage element of the store 62. The storage element is cleared after its contents have been transferred into the buffer store 64 but before the converter 58 finishes its cycle. Therefore, several hundred nanoseconds after initiation the time delay produces a third timing signal to the OR gate 136 in the store 62 shown in FIG. 4b. In addition, the third timing signal is connected to the reset inputs of the flip flops in the store 62. The output of the OR gate 136 enabled the column of flip flops being addressed by the decoder 106 at that time. Thus the outputs of all the flip flops in that column are driven to zero. At the expiration of the third timing signal all the resets and the enabling signals are removed. When the converter 58 finishes its cycle, the clock control 124 produces an output which is connected to the OR gate 136. Because the time delay 134 is low at this time, the AND gates typically shown at 138 are opened. These AND gates provide a parallel connection between each output of the counter 104 and each row of flip flops in the storage 62. The put of the OR gate 136 enables the columns of flip flops presently being addressed by the decoder 106, and the digital signal in the counter 126 is transferred to a storage element in the store 62.

To summarize, each time a gear tooth 92 passes the proximity switch 94 a sampling signal representing a timing period is produced. During each timing period, the timing signal generator 52 produces timing signals causing the counter 104 to change state and the decoder 106 to produce a unique output which addresses a storage element the storage 62. A previously stored digital signal in that storage element is transferred to a buffer store 64. The storage element is then cleared and reloaded with an up-to-date digital signal representing the value of the deflection signal. When the cutting process begins, the gap eliminator 120 will produce a second control signal which is operative to inhibit the output of the convertor 58. In addition, the AND gates typically shown at 137 and connected to the enable inputs of the flip flops in the storage 62 are also inhibited; therefore, the digital signals representing the deflection signal while the spindle is idling are permanently held in the storage 62 while the spindle is in the cutting process. These digital signals continue to be input to the buffer store 64 in response to each sampling signal from the proximity switch 94. The buffer store output is input to the converter 66 which produces an analogue idling noise signal to the preamplifier 116. The preamplifier 116 produces an output connected to the differential amplifier 117. Consequently, while the spindle is in the cutting process, a very accurate indication of idling noise is subtracted from the deflection signal produced by amplifier 88. The output of amplifier 117 produces a corrected deflection signal which represents the actual deflection of the spindle as a result of the cutting process.

Figure 5:
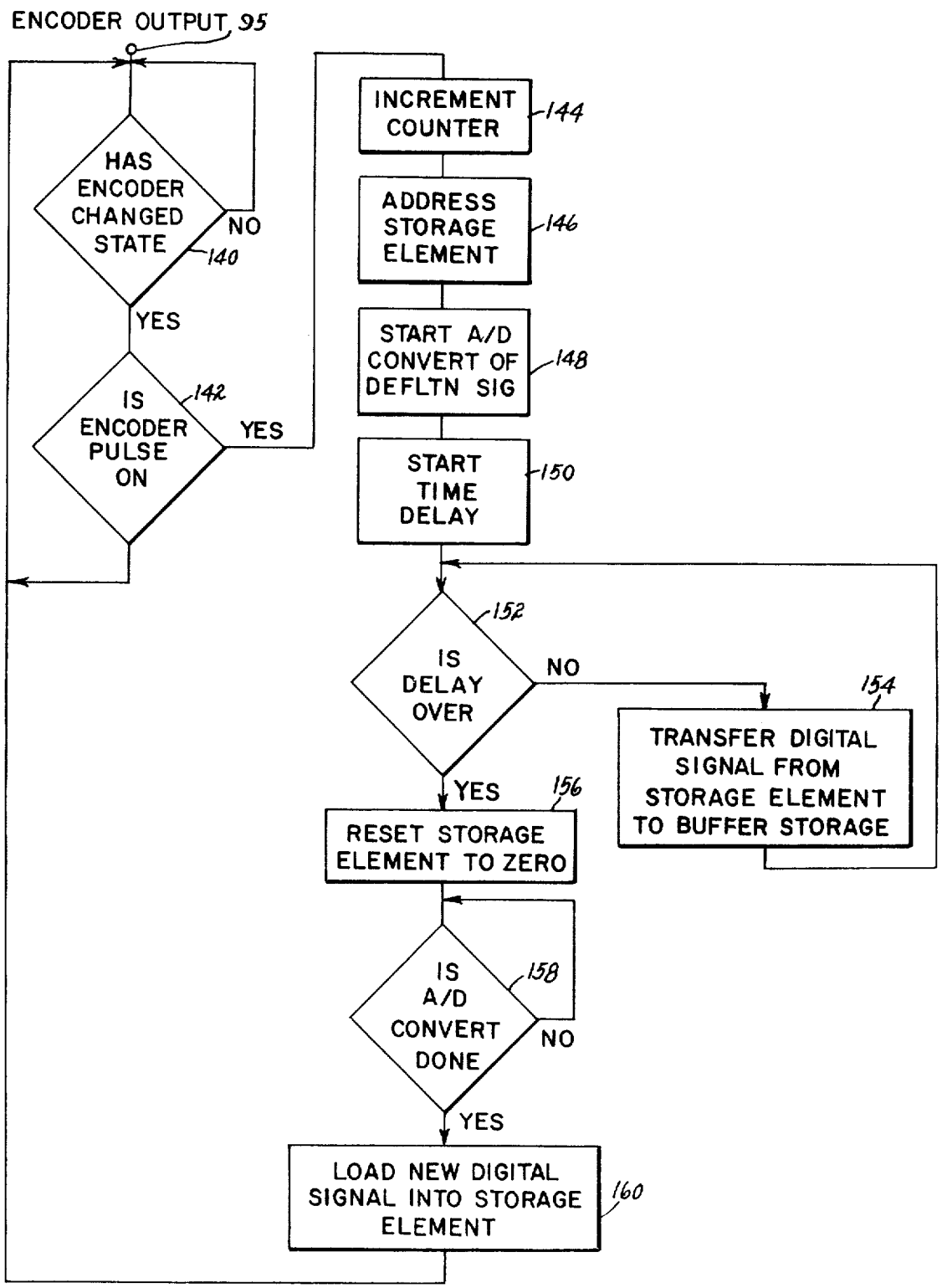
FIG. 5 is a detailed flow chart defining the necessary operations for executing the disclosed process.

Every element between the inputs 95 and 132, and the output of amplifier 117, perform operations which are readily available in a general purpose digital computer. FIG. 5 is a flow chart of functions required by FIGS. 4a and 4b. Generally, a flow chart presents a graphical representation of the definition, analysis or solution of a problem by setting forth the operation and decisions required. The rectangular blocks define the operations required and the diamond shaped blocks define the decisions necessary. The output from the encoder is used to initiate the process. The first decision block 140 determines whether the encoder output has changed state. Next, the decision block 142 determines whether or not a sampling time exists. If the sampling time is not present, the first two decisions must be reexecuted until an encoder pulse or sampling time occurs. At this time, the operation defined in operation blocks 144, 146 and 148 and 150 must be executed. First, block 144 indicates the counter must be incremented. Second, the block 146 requires a storage element be addressed. Next, block 148 requires that the analogue to digital converter begin its cycle to convert an input deflection signal into a corresponding digital signal. Finally, block 150 requires the time delay to be started. Decision block 152 defines action depending on the state of the time delay. If the time delay is not over, operation block 154 requires that a previously stored digital signal in the addressed storage element be transferred to the buffer store. After the delay is over, the flip flops of the addressed storage elements are reset as defined by the operation block 156. The decision block 158 requires the system to wait for the completion of the analogue to digital conversion cycle. If the cycle is not complete, the decision is reexecuted. When the conversation is finished the operation block 160 requires that the new digital signal from the converter be loaded into the addressed storage location. However, this does not, at this time, effect the contents of the buffer store. After the new digital signal is loaded, the process begins again at the decision block 140. It should be noted that the buffer store referred to in process block 154 is connected directly to the output circuits, therefore, immediately upon the buffer store being loaded, the digital signal therein is converted to a corresponding analogue signal which is subtracted from the deflection signal; and a connected deflection signal is generated by the process. Conversion of the flow chart in FIG. 5 into a coded computer program can be readily accomplished by a programmer who is reasonably skilled in a language compatible with a particular general purpose computer.

While the invention has been illustrated in some detail according to the preferred embodiments shown in the accompanying drawings and while the preferred illustrated embodiments have been described in some detail, there is no intention to thus limit the invention to such detail. On the contrary, it is intended to cover all modifications, alterations and equivalents falling within the spirit and scope of the appended claims.

What is claimed is:

1. An apparatus for balancing deflection transducers responsive to a rotating body, said transducers producing a periodic analogue deflection signal representing inherent periodic eccentricities when the body is idling, the apparatus comprising:
   a. means for cyclically generating sampling signals defining a number of timing periods;
   b. means responsive to the deflection signal and the sampling signals for converting the deflection signal during each timing period into a corresponding digital signal;
   c. means responsive to the sampling signals and the digital signal for storing the digital signal during each timing period;
   d. means connected to the storing means for converting a stored digital signal into an analogue idling noise signal; and
   e. means responsive to the deflection signal and the idling noise signal for modifying the deflection signal as a function of the noise signal to produce a corrected deflection signal having a magnitude of approximately zero while the rotating body is idling.

2. An apparatus for balancing deflection transducers responsive to a rotating body, said transducers producing a periodic analogue deflection signal representing inherent periodic eccentricities when the body is idling, the apparatus comprising:
   a. means responsive to the rotating body for generating sampling signals representing a number of timing periods over each period of the eccentricity;
   b. means responsive to the deflection signal and the sampling signals for converting the deflection signal during each timing period into a corresponding digital signal;
   c. means responsive to the sampling signals and the digital signal for storing the digital signal during each timing period;
   d. means connected to the storing means for converting a stored digital signal into an analogue idling noise signal; and
   e. means responsive to the deflection signal and the idling noise signal for modifying the deflection signal as a function of the noise signal to produce a corrected deflection signal having a magnitude of approximately zero while the rotating body is idling.

3. An apparatus for balancing deflection sensors responsive to a rotating body, said sensors producing a periodic analogue deflection signal representing a sensor unbalance when the body is not under the influence of an external load, the apparatus comprising:
   a. means responsive to the rotating body for generating sampling signals defining a predetermined number of timing periods during each period of the analogue deflection signal;
   b. means responsive to the analogue deflection signal and the sampling signals for converting the sign and magnitude of the analogue deflection signal during each timing period to a corresponding digital signal;
   c. means responsive to the sampling signals and the digital signal for storing the digital signal during each timing period;
   d. means responsive to the sampling signals and the storing means for sequentially producing each of the stored digital signals as an output during successive corresponding timing periods;
   e. means responsive to the output of the producing means for converting each digital signal into an analogue idling noise signal representing inherent deflections of the idling rotating body; and
   f. means responsive to the analogue deflection signal and the analogue idling noise signal for changing said deflection signal as a function of the sign and magnitude of the idling noise signal to produce a corrected deflection signal defining a balanced condition of the sensors.

4. An apparatus for balancing deflections sensors responsive to a rotating body and producing a periodic analogue deflection signal, the apparatus comprising:

a. means responsive to the rotating body for generating sampling signals defining a predetermined number of timing periods during each period of the analogue deflection signal;
b. means responsive to the rotating body for producing a control signal when the rotating body is idling;
c. means responsive to the control signal, the analogue deflection signal and the sampling signals for converting the sign and magnitude of the analogue deflection signal into a corresponding digital signal during each timing period while the rotating body is idling;
d. means responsive to the sampling signals and the digital signal for storing the digital signal during each timing period;
e. means responsive to the sampling signals and the storing means for sequentially producing each of the stored digital signals as an output during successive corresponding timing periods;
f. means responsive to the output of the producing means for converting each digital signal into an analogue idling noise signal representing inherent deflections of the idling rotating body; and
g. means responsive to the analogue deflection signal and the analogue idling noise signal for changing said deflection signal as a function of the sign and magnitude of the idling noise signal to produce a corrected deflection signal defining a balanced condition of the sensors.

5. An apparatus for balancing deflection sensors responsive to a rotating body, said sensors producing a periodic analogue deflection signal representing a sensor unbalance when the body is not under the influence of an external load, the apparatus comprising:
a. means responsive to the rotating body for generating sampling signals defining a predetermined number of timing periods during each period of the analogue deflection signal;
b. means responsive to the sampling signals for generating a number of timing signals during each timing period;
c. a digital store responsive to the timing signals and including a number of storage elements and an addressing circuit for addressing a unique storage element containing a previously stored signal;
d. a buffer store connected to the digital store and responsive to the timing signals for storing the previously stored signal in the addressed storage element;
e. means responsive to the timing signals and the analogue signal and having an output connected to the digital store for converting the analogue signal into a corresponding digital signal and transferring said digital signal into the addressed storage element;
f. means connected to the buffer store for converting each digital signal into an analogue idling noise signal representing inherent deflections of the idling rotating body; and
g. means responsive to the analogue deflection signal and the analogue idling noise signal for changing said deflection signal as a function of the sign and magnitude of the idling noise signal to produce a corrected deflection signal defining a balanced condition of the sensors.

6. An apparatus for balancing a deflection transducer circuit responsive to a rotating body and producing a periodic analogue deflection signal, the apparatus comprising:
a. a position encoder coupled to the rotating body for producing a number of sampling signals representing a number of timing periods during each period of the analogue deflection signal;
b. a timing signal generator connected to the position encoder for producing a number of timing signals during each of the timing periods;
c. means responsive to the rotating body for producing a first control signal when the rotating body is idling and a second control signal when the rotating body is under the influence of an external load;
d. an addressing circuit connected to the timing signal generator for producing an addressing signal in response to a first timing signal;
e. a digital store connected to the timing signal generator and the addressing circuit and containing a plurality of storage elements each containing a previously stored digital signal, one of said elements being uniquely selected by the addressing signal and being cleared to zero in response to a third timing signal and the first control signal;
f. a buffer store connected to the timing signal generator and the digital store for storing the previously stored digital signal in response to a second timing signal and maintaining said signal as an output for the duration of the
g. an analogue to digital converter having inputs responsive to the control signals, the analogue deflection signal and the timing signals and an output connected to the digital store for converting the analogue deflection signal into a corresponding digital signal in response to the second timing signal and the first control signal and transferred said digital signal to the uniquely selected storage element, said converter being inhibited in response to the second control signal;
h. a digital to analogue converter connected to the buffer store for converting the previously stored digital signal into an analogue idling noise signal; and
i. an amplifier circuit connected to the digital to analogue converter and the transducer circuit for subtracting during each timing period the idling noise signal from the analogue deflection signal to produce a corrected deflection signal.

7. A method for balancing deflection sensors responsive to a rotating body to compensate for deflections inherent in an idling rotating of said body, said sensors producing a periodic analogue deflection signal, the method comprising the steps of:
a. generating a number of sampling signals representing timing periods during each period of the analogue deflection signal;
b. converting the magnitude of the analogue deflection signal into a corresponding digital signal during each timing period generated during an idling rotation of said body;
c. storing each of the digital signals;
d. converting each digital signal into a corresponding analogue idling noise signal; and
e. modifying the analogue deflection signal as a function of the idling noise signal to produce a corrected deflection signal having a magnitude of approximately zero when the rotating body is idling.

8. A method for balancing deflection sensors responsive to a rotating body by compensating a periodic analogue deflection signal from said sensors by a signal representing inherent deflections during an idling rotating of said body, the method comprising the steps of:
   a. generating a number of sampling signals representing timing periods in response to each period of the deflection signal;
   b. producing a number of timing signals in response to each of the sampling signals;
   c. converting during an idling rotating of said body the sign and magnitude of the analogue deflection signal into a representative digital signal in response to one timing signal;
   d. storing the digital signal in a digital store in response to another timing signal;
   e. transferring the digital signal from said digital store to a buffer store in response to a successive corresponding sampling signal;
   f. converting the digital signal into an analogue idling noise signal; and
   g. subtracting during each timing period the idling noise signal from the analogue deflection signal to produce a corrected deflection representing an output of balanced deflection sensors.

9. A method for balancing deflection sensors responsive to a rotating body, said sensors producing a periodic analogue deflection signal representing inherent deflections of the body when no external load is applied thereto, the method comprising the steps of:
   a. generating a plurality of sampling signals representing timing periods during each period of the analogue deflection signal;
   b. addressing in response to each sampling signal a unique storage element in a digital store, said element containing a previously stored digital signal therein;
   c. transferring the previously stored digital signal from the unique storage element to a buffer store;
   d. converting the digital signal in the buffer store into an analogue idling noise signal;
   e. subtracting the idling noise signal from the analogue deflection signal to produce a corrected deflection signal defining a balanced state of the deflection sensors;
   f. clearing the unique storage element to zero;
   g. converting during each timing period the analogue deflection signal into a new digital signal; and
   h. storing the new digital signal in the unique storage element in the digital store.

10. A method for balancing deflection sensors responsive to a rotating body by compensating a periodic analogue deflection signal from said sensors by a signal representing inherent deflections during an idling rotating of said body, the method comprising the steps of:
   a. generating a plurality of sampling signals representing timing periods during each period of the analogue deflection signal;
   b. generating a number of timing signals in response to each of the sampling signals;
   c. addressing in response to a first timing signal a unique storage element in a digital store, said element containing a previously stored digital signal;
   d. transferring the previously stored digital signal from the unique storage element into a buffer store in response to a second timing signal;
   e. generating a control signal in response to an idling rotation of said body;
   f. clearing the unique storage element to zero in response to a third timing signal and the control signal;
   g. converting the analogue deflection signal into a new digital signal in response to the second timing signal and the control signal;
   h. storing the new digital signal in the unique storage element in the digital store;
   i. converting the previously stored digital signal in the buffer store into an analogue idling noise signal; and
   j. subtracting the analogue idling noise signal from the analogue deflection signal to produce a corrected deflection signal defining a balanced condition of the deflection sensors.

* * * * *